A. J. HALL.
SYSTEM OF CONTROL.
APPLICATION FILED JAN. 5, 1918.
1,393,439.
Patented Oct. 11, 1921.
2 SHEETS—SHEET 1.
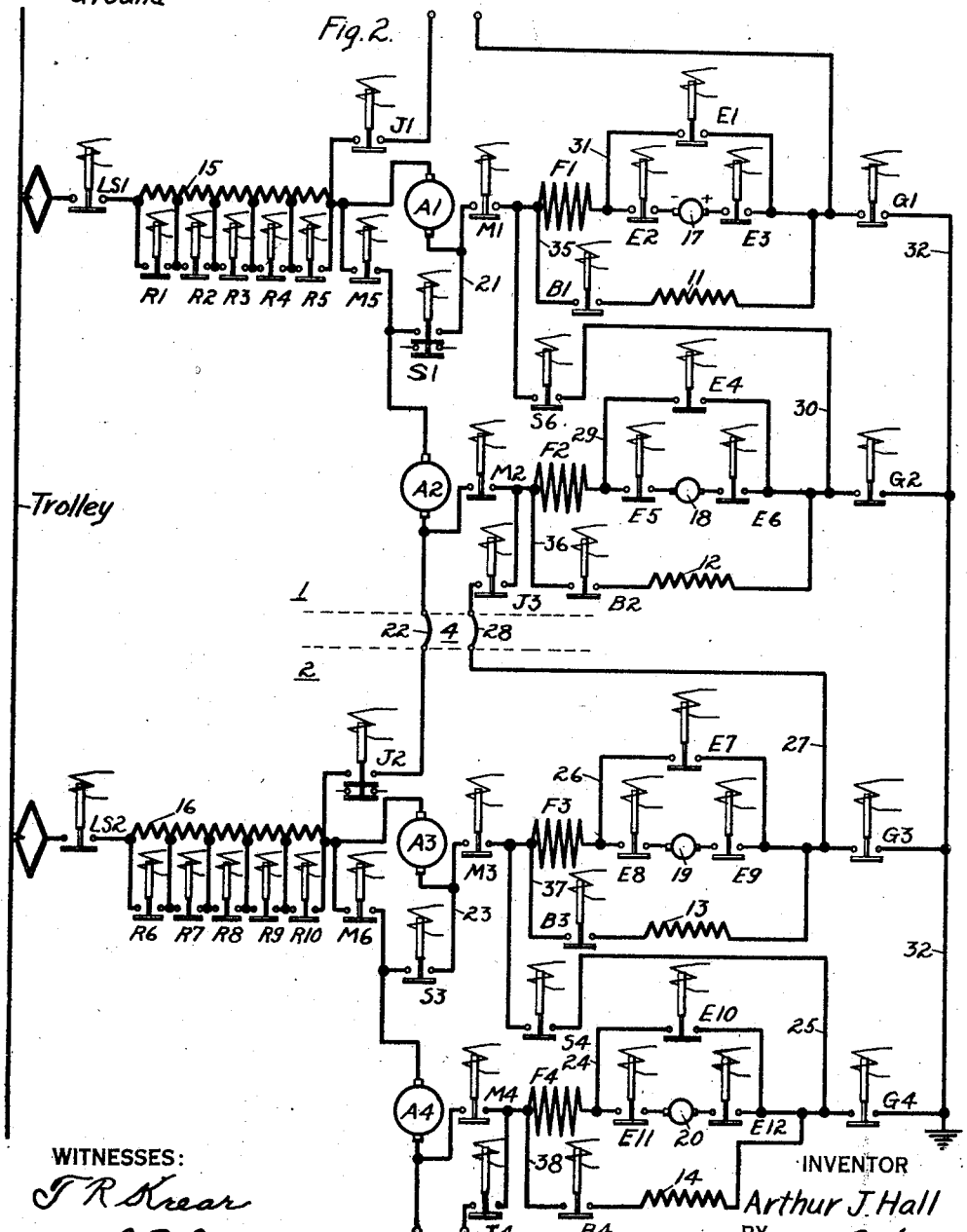
WITNESSES:
T R Krear
W R Coley
INVENTOR
Arthur J. Hall
BY
Wesley G. Carr
ATTORNEY

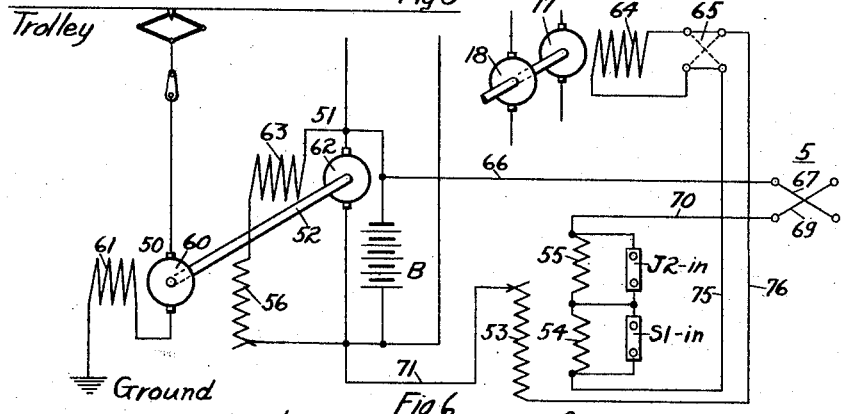

UNITED STATES PATENT OFFICE.

ARTHUR J. HALL, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,393,439.  Specification of Letters Patent.  Patented Oct. 11, 1921.

Application filed January 5, 1918. Serial No. 210,520.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Systems of Control, of which the following is a specification.

My invention relates to systems of control, and particularly to the control of electric motors and generators that are located upon mechanically coupled cabs or half-units of a locomotive and are supplied from a relatively high-voltage circuit.

One object of my invention is to interconnect the main motor circuits through a jumper cable or connection between the above-mentioned cabs or half-units in such manner that various series and parallel groupings of the main motors, during connection to the high-voltage circuit, may be effected from a single cab platform under the control of one operator.

Another object of my invention is to effect a series connection of certain auxiliary exciting circuits that are employed particularly during regenerative operation of the locomotive through a jumper cable or connection between the locomotive cabs, whereby a desirably simplified and interdependent auxiliary exciting system is provided and satisfactory regenerative operation of the main machines is secured.

For a better understanding of the nature of the present invention, reference may be had to the accompanying drawings, wherein Figure 1 is an outline view of a pair of mechanically coupled locomotive cabs or half-units; Fig. 2 is a diagrammatic view of the main circuits of a system of control organized in accordance with the invention; Fig. 3 and Fig. 4 are sequence charts of well-known form corresponding to acceleration and to regeneration, respectively, and indicating the preferred order of operation of the various switches that are shown in Fig. 2; Fig. 5 is a diagrammatic view of certain auxiliary exciting circuits in one locomotive cab; and Fig. 6 is a simplified diagrammatic view corresponding to a duplication of Fig. 5 and representing the interconnection of circuits upon the two locomotive cabs.

Referring to Fig. 1 of the drawings, the structure shown comprises a plurality of locomotive cabs or half-units 1 and 2, which are suitably associated with an overhead supply-circuit conductor marked "Trolley" and running track-rails marked "Ground", the two cabs being mechanically coupled in any suitable manner, as by an articulated joint 3. A plurality of flexible jumper cable or connections 4 and 5, of a well-known type, are provided for the purpose of permitting the desired interconnection of main and of auxiliary circuits, respectively, between the two cabs, such jumper connections being associated with the locomotive bumpers or with any other suitable mechanical part, in accordance with familiar practice. If desired, the main and the auxiliary-circuit jumper connections may be embodied in a single flexible jumper cable, as will be understood, although, for the sake of clearness, two separate jumper lines are illustrated.

Referring now to Fig. 2, the system shown comprises the relatively high-voltage supply-circuit conductors Trolley and Ground; a plurality of main propelling motors respectively having commutator-type armatures $A1$, $A2$, $A3$ and $A4$ and exciting field windings $F1$, $F2$, $F3$ and $F4$ of the series type; a plurality of stabilizing resistors 11 to 14, inclusive, and axle-driven exciters or auxiliary generators 17 to 20, inclusive, such resistors and exciters being employed for regenerative purposes, as subsequently set forth in detail; a plurality of main-circuit variable resistors 15 and 16; certain conductors of the jumper-cable 4; and a plurality of electrically-controlled switches for governing the various main-circuit connections in accordance with the sequence charts of Fig. 3 and of Fig. 4 during the accelerating and the regenerative period, respectively.

The upper half of the control system (above the upper dotted line near the jumper conductors 4) represents the main-circuit connections that are located upon the cab or vehicle 1, while the lower system represents the main circuits upon the other cab or vehicle 2. By reason of the relatively high voltage of the illustrated supply circuit, it is necessary, at the beginning of the accelerating period and at the end of the regenerative period, to connect all the illustrated main machines in series relation, and such action is permitted through the jumper cable 4, as subsequently more fully set forth.

Inasmuch as the particular type of control system that is employed for governing the illustrated main circuits is immaterial to my present invention, I have not deemed it necessary to illustrate and describe a master controller and a corresponding auxiliary control system for governing the various switches in the desired sequence, since those skilled in the art may readily supply such a controller, or its equivalent, without requiring any inventive act.

Assuming, therefore, that it is desired to effect acceleration of the main motors that are illustrated in Fig. 2, the governing master controller (not shown) is moved to its initial operative position, corresponding to step $a$ of the sequence chart, Fig. 3, whereby switches LS1, S1, J2, S3, S4, J3, S6, M4, G1, E1, E4, E7 and E10 are closed. Under such conditions, a main circuit is established from the trolley, through switch LS1, the entire resistor 15, main aramture A1, conductor 21, switch S1, main armature A2, conductor 22 of the jumper 4, switch J2, main armature A3, conductor 23, switch S3, main armature A4, switch M4, field winding F4, conductor 24, switch E10, conductor 25, switch S4, field winding F3, conductor 26, switch E7, conductor 27, conductor 28 of the jumper 4, switch J3, field winding F2, conductor 29, switch E4, conductor 30, switch S6, field winding F1, conductor 31, switches E1 and G1, and conductor 32, to the negative supply-circuit conductor Ground.

The main motors are thus initially connected in series-circuit relation, with all of the field windings on the negative or ground side of all the armatures, whereby certain well-known advantages, such as decreased cost and space requirements of insulating material, are obtained.

In positions $b$, $c$, $d$ and $e$ of the master controller (not shown), the switches R1 to R5, inclusive, are successively closed, in accordance with the indicated sequence, to gradually short-circuit the resistor 15 and thus increase the operating speed of the main motors. Position $e$ thus corresponds to full-series running condition.

To effect the transition of the motors to series-parallel relation, the resistor short-circuiting switches R1 to R5, inclusive, are first opened and then switches LS2, M2 and G3 are closed, as indicated in step $f$ of the sequence chart. In this way, the circuit of the main motors for the armatures A3 and A4 is temporarily short-circuited through the switches J2, M2 and J3, and, as soon as the switches M2 and G3 are closed, the switches J2 and J3 are opened, as indicated in transition position $f$, whereby the familiar "shunting" type of transition of the two control units corresponding to the respective locomotive cabs is effected.

At this time, therefore, the four main motors are connected in series-parallel relation in accordance with the following circuits: From the line switch LS1 and the resistor 15, one circuit is continued, through main armature A1, conductor 21, switch S1, armature A2, switch M2, field winding F2, conductor 29, switch E4, conductor 30, switch S6, field winding F1, conductor 31, switches E1 and G1 and conductor 32, to Ground. The corresponding other main circuit is established from the trolley, through line switch LS2, resistor 16, armature A3, conductor 23, switch S3, armature A4, switch M4, field winding F4, conductor 24, switch E10, conductor 25, switch S4, field winding F3, conductor 26 and switches E7 and G3, to the negative conductor 32.

In positions $g$ to $k$, inclusive, the resistor short-circuiting switches R1 to R10, inclusive, are closed in corresponding pairs to uniformly increase the accelerating speed of the two sets of driving motors.

To effect transition to the parallel connection of the motors, all of the resistor-short-circuiting switches are first opened and then switches M1, M3, G2 and G4 are closed, as indicated in position $l$ of the sequence chart. In this way, the main motors having the armatures A2 and A4 are temporarily short-circuited through the switches M1 and M3, respectively, and switches S1, S3, S4 and S6 are thereupon opened while switches M5 and M6 are then closed, as indicated in position $l$. Thus, the familiar "shunting" type of transition is applied to the above-mentioned motors, which are thereby connected in parallel relation in accordance with the following circuits: From the common resistor 15, one main circuit is established through the armature A1, switch M1, field winding F1, conductor 31 and switches E1 and G1, to negative conductor 32, while a corresponding circuit is completed from the resistor 15, through switch M5, armature A2, switch M2, field winding F2, conductor 29 and switches E4 and G2, to the negative conductor 32. In the other cab or half-unit, one main circuit is established from the common resistor 16 through armature A3, switch M3, field winding F3, conductor 26 and switches E7 and G3 to the negative conductor, while a similar circuit is continued from the resistor 16 through switch M6, armature A4, switch M4, field winding F4, conductor 24 and switches E10 and G4, to Ground.

In positions $m$ to $q$, inclusive, the various resistor-short-circuiting switches R1 to R10, inclusive, are again closed in pairs to effect a desirably uniform acceleration of the main motors, which are thus brought up to full-speed conditions, corresponding to full parallel operation thereof, in position $q$.

It will be observed that the jumper conductors 22 and 28 are thus employed to effect the necessary initial series relation of the several locomotive driving motors from the high-voltage circuit, and, in order to permit the use of either cab 1 or cab 2 as the leading vehicle, the additional switch J1 and the illustrated associated conductors near the top of Fig. 2 are employed if the upper control system is to be used in the rear cab, while a switch J4 and the illustrated associated conductors near the bottom of Fig. 2 are to be utilized whenever the lower control system is embodied in the leading locomotive half-unit.

Assuming that it is desired to effect regenerative operation of the system under such high-speed conditions, the governing master controller (not shown) is moved to its position $a'$, whereupon switches LS1, LS2, R1 to R10, inclusive, M1 to M6, inclusive, G1 to G4, inclusive, and E2, E3, E5, E6, E8, E9, E11 and E12, and B1 to B4, inclusive, are all closed, as indicated in the regenerative sequence chart, Fig. 4. Consequently, the main-circuit resistors 15 and 16 are initially short-circuited to prevent waste of regenerated power, and the main armatures are connected in parallel relation, while the axle-driven exciters 17 to 20, inclusive, are employed to energize the main field windings F1 to F4, inclusive, in accordance with the following circuits: one main circuit is established from Ground through negative conductor 32, switch G1, stabilizing resistor 11, switch B1, conductor 35, switch M1, armature A1 and line switch LS1 to the trolley. A second circuit is continued from the negative conductor 32 through switch G2, stabilizing resistor 12, switch B2, conductor 36, switch M2, armature A2, and switch M5 to the line switch LS1. A third and a fourth circuit, which are located upon the locomotive cab 2, are respectively completed from the common grounded conductor 32, through switch G3, stabilizing resistor 13, switches B3 and M3, armature A3, line switch LS2, to the trolley, and through switch G4, stabilizing resistor 14, switches B4 and M4, armature A4 and switch M6 to the line switch LS2.

The exciting or main-field-winding circuit, in the case of the main machine having the armature A1, is established from the positive terminal of the axle-driven exciter 17, through switch E3, stabilizing resistor 11, switch B1, field winding F1 and switch E2, to the negative terminal of the exciter 17. The remaining field windings are connected through the remaining exciters 18, 19 and 20 respectively across the stabilizing resistors 12, 13 and 14, by reason of the closure of the switches E5, E6, etc., that correspond to switches E2 and E3.

Generally speaking, therefore, the several armature circuits, respectively including one of the main armature windings and one of the stabilizing resistors, are connected in parallel relation across the supply circuit, while the various sets of auxiliary exciters and main field windings are connected in parallel relation to the respective stabilizing resistors to send current through them in the same direction as that taken by the regenerated current, as indicated by the arrows. Such regenerative connections are not of my present invention, but are fully set forth and claimed in a copending application of Rudolf E. Hellmund, Serial No. 44,443, filed August 9, 1915, and assigned to the Westinghouse Electric & Manufacturing Company.

To compensate for the gradual decrease in vehicle speed during the regenerative period, in the first place, the voltage of the axle-driven exciters is gradually increased to correspondingly augment the excitation of the main field windings and thus maintain the desired predominance of the main-armature voltages over the concurrent supply-circuit voltage. Such variation of exciter voltage is indicated in position $b'$ of the sequence chart and may be accomplished in any desirable manner, one method being illustrated in Fig. 5 and in Fig. 6, which will hereinafter be described in detail.

In order to recuperate a greater degree of energy from the momentum-driven vehicle than would be possible if the parallel relation of the main armatures were maintained, the armature circuits are changed over to series-parallel relation during the intermediate speed regenerative operation and to series relation during the lower regenerative speed ranges of the vehicle.

In position $c'$, therefore, the desired transition to series-parallel relation of the motors, after the exciter voltage has been increased to its maximum value, is inaugurated by first opening the parallel connecting switches M1, M3, M5, M6, G2 and G4 and then closing switches S1, S3, S4 and S6, as indicated in position $d'$. Under such conditions, therefore, one main circuit is established from the grounded conductor 32, through switch G1, stabilizing resistor 11, switches B1 and S6, conductor 30, stabilizing resistor 12, switch B2, conductor 36, switch M2, armature A2, switch S1, conductor 21, armature A1, and line switch LS1 to the trolley. The similar circuit in the locomotive cab 2 is continued from grounded conductor 32, through switch G3, stabilizing resistor 13, switch B3, conductor 37, switch S4, conductor 25, stabilizing resistor 14, switch B4, conductor 38, switch M4, armature A4, switch S3, conductor 23, armature A3 and line switch LS2, to Trolley.

The two sets of main machines corresponding to the respective locomotive cabs are thus connected in series-parallel relation and again the exciter voltage may be increased, as indicated in position $e'$, to compensate for the gradual decrease of vehicle speed.

In the next transition position $f'$, switches LS2, M2 and G3 are first opened and then switches J2 and J3 are closed, as indicated in position $g'$.

At this time, therefore, a regenerative or main armature circuit is established from the grounded conductor 32, through switch G1, stabilizing resistor 11, switch B1, conductor 35, switch S6, conductor 30, stabilizing resistor 12, switch B2, conductor 36, switch J3, jumper conductor 28, conductor 27, stablizing resistor 13, switch B3, conductor 37, switch S4, conductor 25, stabilizing resistor 14, switch B4, conductor 38, switch M4, armature A4, switch S3, conductor 23, armature A3, switch J2, jumper conductor 22, armature A2, switch S1, conductor 21, armature A1 and the line switch LS1 to the trolley.

A series relation of the main armature circuits, embodying conductors of the jumper cable 4, is thus established and, to compensate for the gradual decrease of vehicle speed until a relatively low running speed is attained, the voltage of the axle-driven exciters may again be suitably increased.

Referring now to the auxiliary circuits that are shown in Fig. 5 and in Fig. 6, an auxiliary motor-generator set, embodying a driving machine 50 and a generator 51 which are mounted upon a shaft 52 or the equivalent, is employed for the purpose of converting the relatively high voltage of the supply circuit to a suitably low voltage for excitation purposes. A storage battery B, which is connected in parallel relation to the generator 51, and a plurality of resistors 53, 54, 55 and 56 are provided for purposes to be set forth. The auxiliary-circuit jumper connection 5 is utilized for effecting a series relation of the generator-armature circuits in the two locomotive cabs 1 and 2, as indicated in a simple manner in Fig. 6.

The auxiliary driving motor 50 preferably comprises a plurality of series-related armature windings to permit reliable operation from the relatively high-voltage supply circuit, but, for the sake of simplicity, only one armature 60 is here shown, and an exciting field winding 61 is connected in series relation with the armature 60.

The auxiliary generator 51 is provided with a commutator-type armature 62 and an exciting field winding 63, which is connected, through the variable resistor 56, across the terminals of the armature 62 and, therefore, also across the storage battery B. It will be understood that the auxiliary generator 51 may be employed for other familiar purposes in the locomotive, in addition to the exciting function that is here illustrated.

An exciting field winding 64 for the axle-driven generators 17 and 18, which may either be separate machines or a double-commutator machine employing the same armature core and the same field winding 64, is energized, through a reversing switch 65 and the resistors 53, 54 and 55, partially from the generator 51.

As stated above, the system of Fig. 5 represents the auxiliary exciting apparatus that is located upon one vehicle, while Fig. 6 indicates the complete circuit interconnections of the two locomotive cabs. Referring to the simplified diagram, Fig. 6, the exciting circuit for the axle-driven armatures is established from the positive terminal of the generating armature 62 upon the locomotive cab 1, through conductor 66, conductor 67 of the auxiliary jumper 5, exciting field winding 74 for the axle-driven armatures 19 and 20 that are located upon the locomotive cab 2, variable resistor 73, generating armature 72 of the vehicle 2, conductor 68, conductor 69 of the jumper 5, conductor 70, exciting field winding 64 for the axle-driven armatures 17 and 18 that are located upon the vehicle 1, variable resistor 53, and conductor 71 to the negative terminal of the auxiliary generator 62. The reason for crossing the jumper conductors 67 and 69 resides in the reversed relative polarity of the two auxiliary generators 62 and 72, as indicated by the plus and minus signs.

By thus connecting the exciter-field-winding circuits for the two locomotive cabs in series relation, the excitation of both exciter machines varies equally and simultaneously, irrespective of the manner in which either regulating rheostat 53 or 73 is operated for the purpose of gradually increasing the voltage of the auxiliary field windings 64 and 74, and, therefore, of the main-machine field windings, as the vehicle speed decreases during the regenerative period. It has been found that considerable difficulty results from the use of separate exciting circuits in the two locomotive cabs, for the following reasons. One half-unit or set of motors, dependent upon the variation of the corresponding wheel diameters, motor air-gaps and the like, tends to take more than its share of the regenerative load, and the usual type of automatic regulation employing the familiar limit switch is such that, when one machine starts to "skid," the corresponding field-regulating rheostat continues to move forward, which aggravates, instead of remedies, the "skidding" conditions. As the result of such operation, bad flat spots have developed in various locomotive driving wheels. However, by employing the series interconnection of circuits through the agency of the illustrated jumper cable 5, such difficulties are all removed, and smooth and uniform regenerative operation of both locomotive half-units is effected.

In addition to the gradual exclusion of the regulating resistors 53 and 73 to compensate for the above-mentioned decrease of main-machine speed during each operating range of the regenerative period, it is further advisable to increase the initial value of voltage that is impressed upon the field windings for the axle-driven exciters each time that a transition to a lower-speed grouping is effected. To produce this result, the resistors 54 and 55, which are connected in circuit with the axle-driven-exciter field windings 64 and 74, (a similar set being provided in the locomotive cab 2), are respectively short-circuited when the main motors are changed over to series-parallel relation and to series relation. The desired result may readily be effected by means of electrical interlocks of the familiar type that is illustrated in connection with the switches S1 and J2, corresponding to series-parallel and to series operation of the motors, respectively. Thus, upon the closure of the switch S1 in position $d'$, of the sequence chart, the auxiliary resistor 54 is short-circuited by interlock S1—in, and, consequently, the desired initial increase of axle-driven-exciter voltage is produced. Similar, the auxiliary resistor 55 is short-circuited by interlock J2—in upon the closure of switch J2 in position $g'$, and, in this way, the desired increase of axle-driven exciter voltage during the lower speed regenerative range of the main machines is automatically effected.

I do not wish to be restricted to the specific circuit connections or arrangements of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a plurality of electric vehicles, and a plurality of dynamo-electric machines located upon each vehicle, of means for electrically interconnecting said vehicles to effect series operation of all said machines, and means for effecting series-parallel and parallel operation of said machines with the sets of machines on the respective vehicles electrically disconnected.

2. In a system of control, the combination with a plurality of electric vehicles, and a plurality of dynamo-electric machines located upon each vehicle, of a plural-conductor jumper cable located between said vehicles for effecting series connection of all the main machines, and a plurality of normally open switches respectively connected in series relation with the jumper conductors and located on the respective vehicles.

3. In a system of control, the combination with a plurality of electric vehicles, a main dynamo-electric machine and an exciting circuit therefor including a source of energy located upon each vehicle, of means for electrically interconnecting said circuits and said sources to effect series operation of said exciting circuits.

4. In a system of control, the combination with a plurality of electric vehicles, and a main dynamo-electric machine having an armature and a field winding, an axle-driven exciter for said field winding and an auxiliary generator for energizing the exciter field-winding located upon each vehicle, of means for electrically interconnecting said vehicles to effect series operation of both generators and both exciter field-windings.

5. In a system of control, the combination with a plurality of electric vehicles, and a main dynamo-electric machine having an armature and a field winding, an exciter for said field winding and an auxiliary source for energizing the exciter field-winding located upon each vehicle, of a plural-conductor detachable jumper cable located between said vehicles for effecting series operation of both sources and both exciter field-windings.

6. In a system of control, the combination with a plurality of electric vehicles, and a dynamo-electric machine located upon each vehicle, of means comprising conductors located near the confronting ends of said vehicles for so interconnecting the vehicles as to permit operating said machines in series relation, and other conductors located near the remaining ends of the vehicles to permit an interchange of leading and trailing vehicles.

7. In a system of control, the combination with a plurality of electric vehicles, and a dynamo-electric machine located upon each vehicle, of means comprising conductors located near the confronting ends of said vehicles for so interconnecting the vehicles as to permit operating said machines in series relation, other conductors located near the remaining ends of the vehicles to permit an interchange of leading and trailing vehicles, and a plurality of normally open switches respectively located in non-corresponding conductors near the respective ends of each vehicle.

In testimony whereof, I have hereunto subscribed my name this 21st day of Dec., 1917.

ARTHUR J. HALL.